United States Patent
Zedlewski et al.

(10) Patent No.: US 7,581,064 B1
(45) Date of Patent: Aug. 25, 2009

(54) UTILIZING CACHE INFORMATION TO MANAGE MEMORY ACCESS AND CACHE UTILIZATION

(75) Inventors: John Zedlewski, Cambridge, MA (US); Carl Waldspurger, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 105 days.

(21) Appl. No.: 11/410,477

(22) Filed: Apr. 24, 2006

(51) Int. Cl.
*G06F 12/00* (2006.01)
(52) U.S. Cl. .................. 711/118; 711/121; 711/130; 711/141; 711/144; 711/146; 711/119; 711/154; 711/165
(58) Field of Classification Search .................. 711/118, 711/144, 145, 154, 165, 167; 712/216; 717/151, 717/152, 154
See application file for complete search history.

(56) References Cited

U.S. PATENT DOCUMENTS

| | | | |
|---|---|---|---|
| 6,202,127 B1 | 3/2001 | Dean et al. | |
| 6,564,297 B1 | 5/2003 | Kosche | |
| 7,000,072 B1 * | 2/2006 | Aisaka et al. | 711/118 |
| 7,107,400 B2 * | 9/2006 | Benhase et al. | 711/118 |
| 7,124,276 B2 * | 10/2006 | Pullen et al. | 711/210 |
| 7,139,872 B1 | 11/2006 | Bachmat | |
| 7,181,578 B1 * | 2/2007 | Guha et al. | 711/154 |
| 7,383,382 B2 * | 6/2008 | Powell et al. | 711/114 |
| 2003/0033480 A1 * | 2/2003 | Jeremiassen | 711/118 |
| 2003/0155020 A1 * | 8/2003 | Hirota et al. | 137/625.43 |
| 2003/0229767 A1 * | 12/2003 | Lee et al. | 711/154 |
| 2004/0064463 A1 * | 4/2004 | Rao et al. | 707/100 |
| 2004/0117554 A1 * | 6/2004 | Raghavan | 711/118 |
| 2005/0155020 A1 * | 7/2005 | DeWitt et al. | 717/130 |
| 2005/0268038 A1 * | 12/2005 | Yasue | 711/118 |
| 2006/0143421 A1 | 6/2006 | Subramoney et al. | |
| 2006/0206874 A1 * | 9/2006 | Klein | 717/136 |
| 2007/0050548 A1 * | 3/2007 | Bali et al. | 711/118 |
| 2007/0083720 A1 * | 4/2007 | Pullen et al. | 711/158 |
| 2008/0040551 A1 * | 2/2008 | Gray et al. | 711/130 |

OTHER PUBLICATIONS

Office Action dated Jan. 28, 2008 in U.S. Appl. No. 11/410,474.
Response to Office Action dated Apr. 28, 2008 in U.S. Appl. No. 11/410,474.

* cited by examiner

*Primary Examiner*—Jack A Lane

(57) ABSTRACT

In a method of utilizing cache metadata to optimize memory access, cache metadata associated with a set of cache locations is inspected by software. The cache metadata is analyzed to determine memory utilization. Memory access is optimized based on results of the analysis of the cache metadata.

35 Claims, 7 Drawing Sheets

UTILIZING CACHE INFORMATION TO MANAGE MEMORY ACCESS AND CACHE UTILIZATION

CROSS REFERENCE TO RELATED PATENTS

This application is related to U.S. Pat. No. 7,434,002, which issued to Zedlewski et al. on Oct. 7, 2008.

FIELD OF THE INVENTION

Embodiments of the present invention relate to the field of management of computer memory. More specifically, embodiments of the present invention are directed to a technology for utilizing cache information to manage memory access and cache utilization.

DESCRIPTION OF THE RELATED ART

Processors and memory in many computing systems, such as Non-Uniform Memory Access (NUMA) systems, are arranged in nodes that allow for communications between the nodes. In a typical NUMA system, each node is comprised of some number of processors, together with local memory, and (possibly) a shared memory cache, plus some interconnection mechanism to access other (remote) nodes. Likewise, many modern processors which contain multiple cores and/or multiple threads may have many of the same attributes of a NUMA system, such as, shared cache and non-uniform communication speeds (for instance intra-node/processor communication speeds may be faster than inter-node/processor communication speeds). These arrangements allow the processors in such systems to share caches and to share memory. The ability to access remote memory is useful; however several performance penalties are suffered by computing systems when accessing remote memory. These penalties are experienced by physical computing systems and processors, virtual computing systems and processors, and systems composed of both physical and virtual components.

One performance penalty is the slower access times experienced when accessing remote memory rather than local memory. For instance, many programs access memory when they run. If a large amount of the memory being accessed by one of the programs is remote memory, rather than local memory, the program will run less efficiently due to the waiting for remote memory access. The cumulative effect across multiple programs is that they all run slower.

Another performance penalty results from overuse of signal lines that connect nodes together. Because signal lines have limited capacity, a single program that engages in heavy remote memory access can slow down many other programs due to an overtaxing of the bandwidth on the nodal interconnects. This problem is only exacerbated by multiple programs that have heavy remote access memory requirements.

The use of memory caches attempts to solve these problems. However, normal caches often fall short due to their limited size, the conflicting uses of the cache that occur when multiple programs run on a computer system, and the inability of other portions of the computer system to gain visibility into how data is stored and managed within the cache.

Many NUMA systems attempt to solve the performance problems associated with heavy remote access of data by providing some facilities for software to obtain a measure of memory locality. A popular approach along these lines in high-end purpose built systems, such as SGI Origin computers, is providing per-page performance counters. In computing terms, system memory is typically divided into addressable units commonly known as "pages." A page is typically a particular fixed-size contiguous portion of memory determined by computing hardware. In x86 type hardware, for example, a page is a 4 KB or 2 MB contiguous portion of memory. However it is well known that pages of other sizes may be defined and managed. These performance counters allow software to measure the number of accesses to a page from each node. However, this approach incurs a very large overhead in terms of memory consumption and hardware implementation costs. Additionally, lower end, commodity NUMA systems only provide a set of very coarse per-node counters for remote memory access. These coarse counters have no ability to correlate accesses to the particular memory locations or source processors that caused the access.

Some commodity processors, such as MIPS R4000 processors, also allow very limited software access to cache data, but the access is only used for error correction and system initialization. Other approaches utilize cache sampling techniques that require heavy hardware support, and are thus expensive and cumbersome to implement in production systems, such as commodity processors.

A related problem exists in the form of conflict misses that occur due to the sharing of caches that are not fully associative. Caches are often shared by multiple processors in a multi-node system, by multiple software programs that run either sequentially or simultaneously, by multiple threads in a multi-threading system, or by multiple processor cores in a multi-core systems. Such systems can be either physical, virtual, or some combination. Conflict misses occur when a cache's hash function maps several commonly utilized pieces of data to the same portion of the cache.

Traditional operating systems use static cache coloring techniques to mitigate the problem of conflict misses by allocating physical cache pages in ways that are expected to evenly utilize the different portions of the cache. Processor designs have also increased associativity of caches to help overcome the problem of conflict misses. While static cache coloring and widely set-associative caches mitigate conflict miss problems on commodity processors, the possibility for conflict grows substantially when the processor in question contains multiple cores that share a common cache or multiple hardware threads, such as simultaneous multi-threading (SMT), that share a common cache.

In such a shared cache, conflict misses will occur, for instance, when the number of active cache lines at a given index, summed over all active hardware threads/cores, exceeds the cache's associativity. With four cores sharing an eight-way set associative cache, for instance, if each core heavily utilizes three cache lines that map to a given cache index, serious conflict misses can impede performance. However, such a scenario may cause no problems at all on a dual-core processor that is eight-way set associative.

One software technique that addresses this problem is compiler directed coloring. In this technique, during the compilation stage, a designer selects portions of a cache that will be addressed by a program. This technique is useful in single application systems or in situations where there is complete control over all programs that run on a system. However, in most instances, even if a designer can control cache access patterns by specially compiling one program, other programs, such as commercial programs, will have unknown and potentially conflicting cache access patterns. Therefore, it is generally unhelpful to alter cache access patterns of one process through compiler directed coloring, when there is no knowledge of what areas of the cache other processes will utilize.

A second technique, used in some processors, is called dynamic page remapping. Dynamic remapping is a technique whereby the operating system copies data from one page to another, then uses virtual memory to make the process reference the new page. However, this remapping mechanism is only useful if the operating system can figure out which pages are useful to remap in order to increase efficiency.

Some RISC (Reduced Instruction Set Computer) chips have a Software-managed Translation Look-aside Buffer (STLB), and the operating system can use this hardware to figure out which pages are being accessed frequently. This access information allows the operating system to determine which pages are worth remapping. However, commodity processors (such as Intel IA32, AMD x86 and other x86-64 type commodity processors) do not have an STLB so this information gathering technique is impossible on them.

Thus, applications, operating systems, and virtualization software (e.g., Virtual Machine Monitors (VMMs) or hypervisors) designed for simultaneous multi-threading, multi-core processors, or shared cache use will suffer performance penalties if portions of their shared caches are over-utilized. Likewise, performance penalties are also suffered by physical and virtual computing systems which too heavily rely on remote access of memory. Hence the inefficiencies experienced with caches and memory access, are a significant and growing problem in today's computing environment.

Description of Virtual Machines

The advantages of virtual machine technology have become widely recognized. Among these advantages is the ability to run multiple virtual machines on a single host platform. This makes better use of the capacity of the hardware, while still ensuring that each user enjoys the features of a "complete" computer. Depending on how it is implemented, virtualization can also provide greater security, since the virtualization can isolate potentially unstable or unsafe software so that it cannot adversely affect the hardware state or system files required for running the physical (as opposed to virtual) hardware.

As is well known in the field of computer science, a virtual machine (VM) is a software abstraction, or "virtualization," of an actual physical computer system. FIG. 1 shows one possible arrangement of a computer system 700 that implements virtualization. FIG. 1 shows a plurality of virtual machines (VMs) 200-200n and a plurality of virtual machine monitors (VMMs) 300-300n, coupled to an exemplary system hardware platform 100. An optional kernel 600 (used in non-hosted systems) is also shown.

In FIG. 1, a virtual machine (VM) 200, which in this system is a "guest," is installed on a "host platform," or simply "host," which includes system hardware 100 and one or more layers or co-resident components comprising system-level software, such as OS 420 or similar kernel 600, VMMs 300-300n, or some combination of these. As software, the code defining VM 200 will ultimately execute on the actual system hardware 100.

As in almost all computers, this system hardware 100 will typically include one or more CPUs 110, some form of memory 130 (volatile and/or non-volatile), one or more storage devices such as one or more disks 140, and one or more devices 170, which may be integral or separate and removable. In many existing virtualized systems, the hardware processor(s) 110 are the same as in a non-virtualized computer with the same platform, for example, the Intel x86 platform. Because of the advantages of virtualization, however, some hardware vendors have proposed, developed, or released processors that include specific hardware support for virtualization.

Each VM 200 will typically mimic the general structure of a physical computer and as such will usually have both virtual system hardware 201 and guest system software 202. The virtual system hardware typically includes at least one virtual CPU 210, virtual memory 230, at least one storage device such as virtual disk 240, and one or more virtual devices 270. Note that virtual disk 240 and physical disk 140 are also "devices," but are shown separately in FIG. 1 because of the important roles they play. All of the virtual hardware components of VM 200 may be implemented in software to emulate corresponding physical components. The guest system software 202 typically includes a guest operating system (OS) 220 and drivers 224 as needed, for example, for the various virtual devices 270.

To permit computer systems to scale to larger numbers of concurrent threads, systems with multiple CPUs have been developed. Many conventional hardware platforms therefore include more than one hardware processor 110. In many such platforms, each processor is a separate "chip" and may share system resources such as main memory and/or at least one I/O device. "Multi-core" architectures have also been developed (for example, IBM POWER4 and POWER5 architectures, Intel dual-core processors, AMD dual-core processors, as well as the Sun UltraSparc IV), in which more than one physical CPU is fabricated on a single chip, with its own set of functional units (such as a floating-point unit and an arithmetic/logic unit ALU), and can execute threads independently. Multi-cored processors typically share some resources, such as some cache.

Note that a single VM may be configured with more than one virtualized processor. To permit computer systems to scale to larger numbers of concurrent threads, systems with multiple CPUs have been developed. These symmetric multi-processor (SMP) systems are available as extensions of the PC platform and from other vendors. Essentially, an SMP system is a hardware platform that connects multiple processors to a shared main memory and shared I/O devices. Virtual machines may also be configured as SMP VMs. FIG. 1, for example, illustrates multiple virtual processors 210a, 210a, ..., 210c (VCPU0, VCPU1, ..., VCPUm) within the VM 200.

Yet another configuration is found in a so-called "multi-core" architecture, in which more than one physical CPU is fabricated on a single chip, with its own set of functional units (such as a floating-point unit and an arithmetic/logic unit ALU), and can execute threads independently; multi-core processors typically share only very limited resources, such as some cache. Still another technique that provides for simultaneous execution of multiple threads is referred to as "simultaneous multi-threading," in which more than one logical CPU (hardware thread) operates simultaneously on a single chip, but in which the logical CPUs flexibly share not only one or more caches, but also some functional unit(s) and sometimes also the translation lookaside buffer (TLB). This invention may be used regardless of the type—physical and/or logical—or number of processors included in a VM.

If VM 200 is properly designed, applications 260 running on VM 200 will function as they would if run on a "real" computer. This occurs even though the applications are running at least partially indirectly, that is via the guest OS 220 and virtual processor(s) (210a-210c). Executable files will be accessed by guest OS 220 from virtual disk 240 or virtual memory 230, which will be portions of the actual physical disk 140 or physical memory 130 allocated to VM 200. Applications may be installed within VM 200 in a conventional manner, using guest OS 220. Guest OS 220 retrieves files required for the execution of such installed applications from virtual disk 240 in a conventional manner.

Some interface is generally required between the guest software within a VM and the various hardware components and devices in the underlying hardware platform. This interface—which can be generally referred to as "virtualization software"—may include one or more software components and/or layers, possibly including one or more of the software components known in the field of virtual machine technology as "virtual machine monitors" (VMMs), "hypervisors," or virtualization "kernels." Because virtualization terminology has evolved over time and has not yet become fully standardized, these terms do not always provide clear distinctions between the software layers and components to which they refer. For example, "hypervisor" is often used to describe both a VMM and a kernel together, either as separate but cooperating components or with one or more VMMs incorporated wholly or partially into the kernel itself; however, "hypervisor" is sometimes used instead to mean some variant of a VMM alone, which interfaces with some other software layer(s) or component(s) to support the virtualization. Moreover, in some systems, some virtualization code is included in at least one "superior" VM to facilitate the operations of other VMs. Furthermore, specific software support for VMs may be included in the host OS itself. Unless otherwise indicated, the invention described below may be used in virtualized computer systems having any type or configuration of virtualization software.

Moreover, FIG. 1 shows virtual machine monitors that appear as separate entities from other components of the virtualization software. Furthermore, some software components used to implemented one illustrated embodiment of the invention are shown and described as being within a "virtualization layer" located logically between all virtual machines and the underlying hardware platform and/or system-level host software. This virtualization layer can be considered part of the overall virtualization software, although it would be possible to implement at least part of this layer in specialized hardware. The illustrated embodiments are given only for the sake of simplicity and clarity and by way of illustration—as mentioned above, the distinctions are not always so clear-cut. Again, unless otherwise indicated or apparent from the description, it is to be assumed that the invention can be implemented anywhere within the overall structure of the virtualization software, and even in systems that provide specific hardware support for virtualization The various virtualized hardware components in the VM, such as the virtual CPU(s), the virtual memory 230, the virtual disk 240, and the virtual device(s) 270, are shown as being part of the VM 200 for the sake of conceptual simplicity. In actuality, these "components" are usually implemented as software emulations included in the VMM. One advantage of such an arrangement is that the VMM may (but need not) be set up to expose "generic" devices, which facilitate VM migration and hardware platform-independence.

Different systems may implement virtualization to different degrees—"virtualization" generally relates to a spectrum of definitions rather than to a bright line, and often reflects a design choice with respect to a trade-off between speed and efficiency on the one hand and isolation and universality on the other hand. For example, "full virtualization" is sometimes used to denote a system in which no software components of any form are included in the guest other than those that would be found in a non-virtualized computer; thus, the guest OS could be an off-the-shelf, commercially available OS with no components included specifically to support use in a virtualized environment.

In contrast, another concept, which has yet to achieve a universally accepted definition, is that of "para-virtualization." As the name implies, a "para-virtualized" system is not "fully" virtualized, but rather the guest is configured in some way to provide certain features that facilitate virtualization. For example, the guest in some para-virtualized systems is designed to avoid hard-to-virtualize operations and configurations, such as by avoiding certain privileged instructions, certain memory address ranges, etc. As another example, many para-virtualized systems include an interface within the guest that enables explicit calls to other components of the virtualization software.

For some, para-virtualization implies that the guest OS (in particular, its kernel) is specifically designed to support such an interface. According to this view, having, for example, an off-the-shelf version of Microsoft Windows XP as the guest OS would not be consistent with the notion of para-virtualization. Others define para-virtualization more broadly to include any guest OS with any code that is specifically intended to provide information directly to any other component of the virtualization software. According to this view, loading a module such as a driver designed to communicate with other virtualization components renders the system para-virtualized, even if the guest OS as such is an off-the-shelf, commercially available OS not specifically designed to support a virtualized computer system. Unless otherwise indicated or apparent, this invention is not restricted to use in systems with any particular "degree" of virtualization and is not to be limited to any particular notion of full or partial ("para-") virtualization.

In addition to the sometimes fuzzy distinction between full and partial (para-) virtualization, two arrangements of intermediate system-level software layer(s) are in general use—a "hosted" configuration and a non-hosted configuration (which is shown in FIG. 1). In a hosted virtualized computer system, an existing, general-purpose operating system forms a "host" OS that is used to perform certain input/output (I/O) operations, alongside and sometimes at the request of the VMM. The Workstation product of VMware, Inc., of Palo Alto, Calif., is an example of a hosted, virtualized computer system, which is also explained in U.S. Pat. No. 6,496,847 (Bugnion, et al., "System and Method for Virtualizing Computer Systems," 17 Dec. 2002).

As illustrated in FIG. 1, in many cases, it may be beneficial to deploy VMMs on top of a software layer—a kernel 600—constructed specifically to provide efficient support for the VMs. This configuration is frequently referred to as being "non-hosted." Compared with a system in which VMMs run directly on the hardware platform, use of a kernel offers greater modularity and facilitates provision of services (for example, resource management) that extend across multiple virtual machines. Compared with a hosted deployment, a kernel may offer greater performance because it can be co-developed with the VMM and be optimized for the characteristics of a workload consisting primarily of VMs/VMMs. The kernel 600 also handles any other applications running on it that can be separately scheduled, as well as a console operating system 420 that, in some architectures, is used to boot the system and, facilitate certain user interactions with the virtualization software, for example, using applications 430.

Note that the kernel 600 is not the same as the kernel that will be within the guest OS 220—as is well known, every operating system has its own kernel. Note also that the kernel 600 is part of the "host" platform of the VM/VMM as defined above even though the configuration shown in FIG. 1 is commonly termed "non-hosted;" moreover, the kernel may be both part of the host and part of the virtualization software or "hypervisor." The difference in terminology is one of perspective and definitions that are still evolving in the art of virtualization.

SUMMARY OF THE INVENTION

One embodiment of the present invention is a method of utilizing cache metadata to optimize memory access. Cache metadata associated with a set of cache locations is inspected by software. The cache metadata is analyzed to determine memory utilization. Memory access is optimized based on results of the analysis of the cache metadata.

Another embodiment of the present invention is a computer readable medium having computer-readable code embodied therein for causing a computer system to perform a method of utilizing cache metadata to optimize memory access. Cache metadata associated with a set of cache locations is inspected by software. The cache metadata is analyzed to determine memory utilization. Memory access is optimized based on results of the analysis of the cache metadata.

Yet another embodiment of the present invention is a system for utilizing cache metadata to optimize memory access. The system is comprised of a cache and a memory access manager. The memory access manager is configured to couple to the cache. The memory access manager is for extracting cache metadata from hardware of the cache and utilizing the cache metadata for optimizing memory access.

BRIEF DESCRIPTION OF THE DRAWINGS

The accompanying figures, which are incorporated in and form a part of this specification, illustrate embodiments of the technology for utilizing cache information to manage memory access and cache utilization and, together with the description, serve to explain principles discussed below.

DETAILED DESCRIPTION

Figure 1:
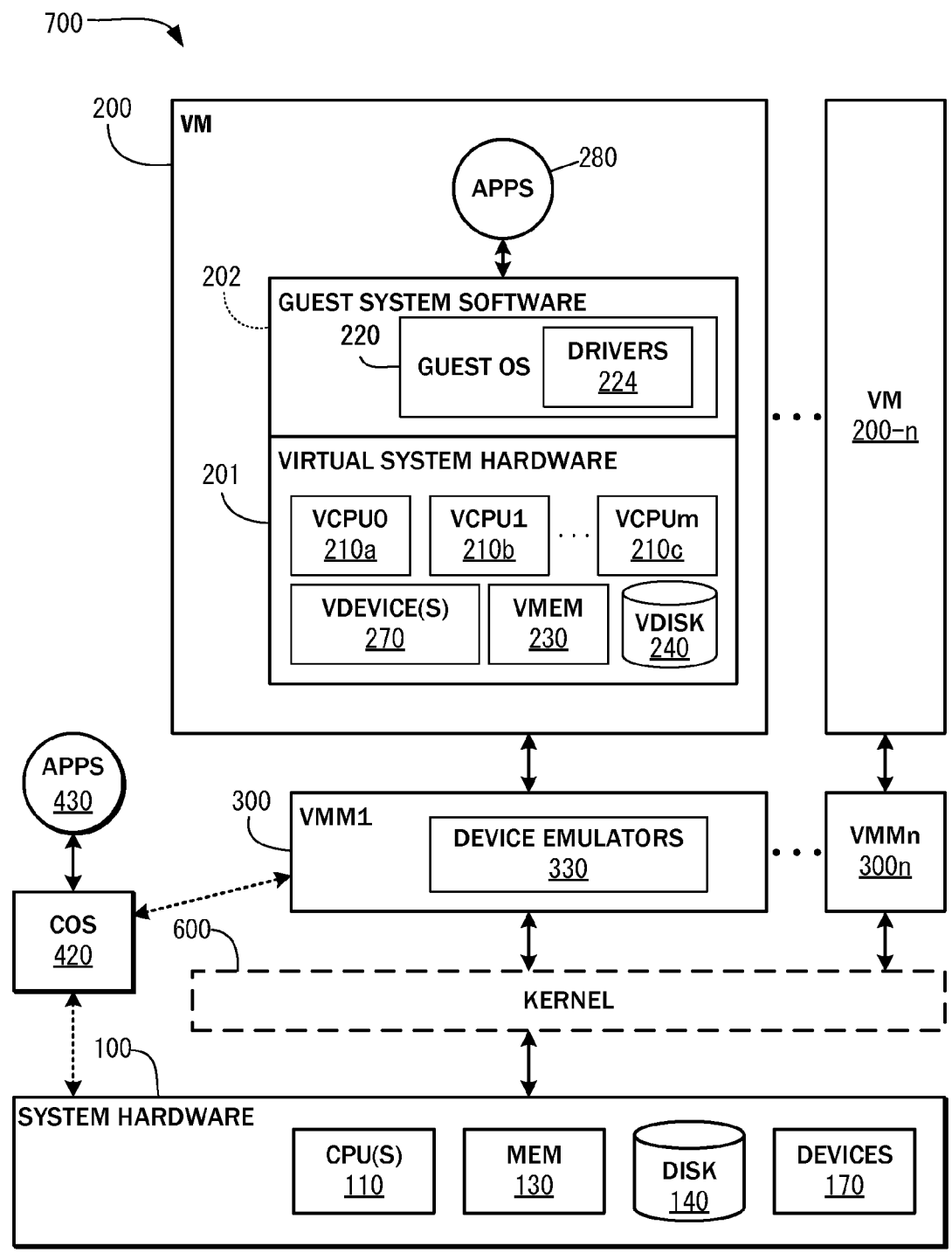
FIG. 1 is a diagram of an exemplary virtualized computer system upon which embodiments of the present invention may be practiced.

Reference will now be made in detail to embodiments of the present invention, examples of which are illustrated in the accompanying drawings. While the invention will be described in conjunction with various embodiments, it will be understood that they are not intended to limit the present invention to these embodiments. On the contrary, the present invention is intended to cover alternatives, modifications and equivalents, which may be included within the spirit and scope the various embodiments as defined by the appended claims. Furthermore, in the following detailed description, numerous specific details are set forth in order to provide a thorough understanding of the present invention. However, the present invention may be practiced without these specific details. In other instances, well known methods, procedures, components, and circuits have not been described in detail as not to unnecessarily obscure aspects of the present embodiments.

Unless specifically stated otherwise as apparent from the following discussions, it is appreciated that throughout the present detailed description, discussions utilizing terms such as "inspecting", "analyzing", "optimizing", "receiving", "requesting", "evicting", "referencing", "determining", "tracking", "improving", "reporting", "probing", "running", "measuring", "reading", "using", "comparing", "scheduling", "ascertaining", "utilizing", "rescheduling", "moving", "copying", "reducing", "relocating", "storing", "recoloring", and "remapping", or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The present invention is also well suited to the use of other computer systems such as, for example, optical computers. Additionally, it should be understood that in embodiments of the invention, one or more of the steps can be performed manually.

Overview of Using Cache Information to Manage Memory Access

As an overview, one embodiment of the present invention is a method of utilizing cache metadata to optimize memory access. In one such method embodiment, software of the present invention inspects cache metadata associated with a set of cache locations. The cache is a part of a physical system or a virtual machine. Cache metadata comprises one or more pieces of cache information such as: a cache tag or "tag" identifying a memory address; recency of use status information for a cache location such as Least Recently Used (LRU) bits or Most Recently Used (MRU) bits; a protocol state of a cache location; information about which hardware thread or core brought a particular piece of data into the cache; or other cache metadata information.

In one embodiment of the present invention, the cache metadata is received in response to requesting the cache metadata from cache hardware. Elements of the present invention analyze the cache metadata to determine memory utilization, such as remote memory utilization of one or more processes, supported by the cache. In various embodiments, analysis of cache metadata comprises one or more techniques, such as: manipulating data at cache locations; periodically inspecting cache metadata to check for changes; determining an amount of space used in the cache by remote memory locations; determining a frequency with which one or more particular remote memory locations are stored within the cache; tracking remote memory utilization over a period of time; and determining a cache utilization rate, such as a hit, miss, conflict, eviction, or thrashing rate for a portion of the cache. Elements of the present invention optimize memory access based on results of the analysis of the cache metadata. In some embodiments, the memory optimization comprises locally storing selected information. In some embodiments, the memory optimization comprises dynamically relocating data to reduce cache color contention within the cache.

Overview of Using Cache Information to Manage Shared Cache Utilization

As an overview, one embodiment of the present invention is a method of optimizing utilization of a shared cache. In one such method embodiment, software of the present invention probes a set of locations in a cache while an observed process is running, descheduled, or interrupted. For example, this probing can comprise running a piece of code to repeatedly access one or more memory addresses that map to a subset of a cache while an observed process is running. The present invention then determines cache misses that occur during the probing. In one embodiment the present invention determines cache misses inferentially via latency of replies from the cache.

In another embodiment, the present invention determines cache misses by reading a hardware performance counter of the processor or cache that increments based on the occurrence of a relevant event the cache or in a memory system associated with the cache. Some examples of relevant events that can trigger incrementing of such a performance counter are: a cache hit, a cache miss, a message sent out to the memory bus from the cache, and etc. Software of the present invention then uses techniques to directly or indirectly determine a variety of cache information, such as: which portions of the cache are used by the observed process, what processes (of several observed processes) highly contend for the same areas of a cache, which processes (of several observed processes) have substantially non-conflicting cache access patterns, and which pages and/or addresses of memory are heavily accessed.

In some embodiments, cache metadata is not used to determine information about the cache, thus making this technique useful in processors where cache metadata is not available to software applications. Elements of the present invention then optimize the use of the shared cache by: remapping pages of memory to reduce contention or improve access efficiency; recoloring pages of memory to reduce cache contention; scheduling non-conflicting processes to run together with one another when possible; and scheduling highly conflicting processes to run separately from one another when possible.

Exemplary System for Managing Memory Access and Cache Utilization

Figure 2:
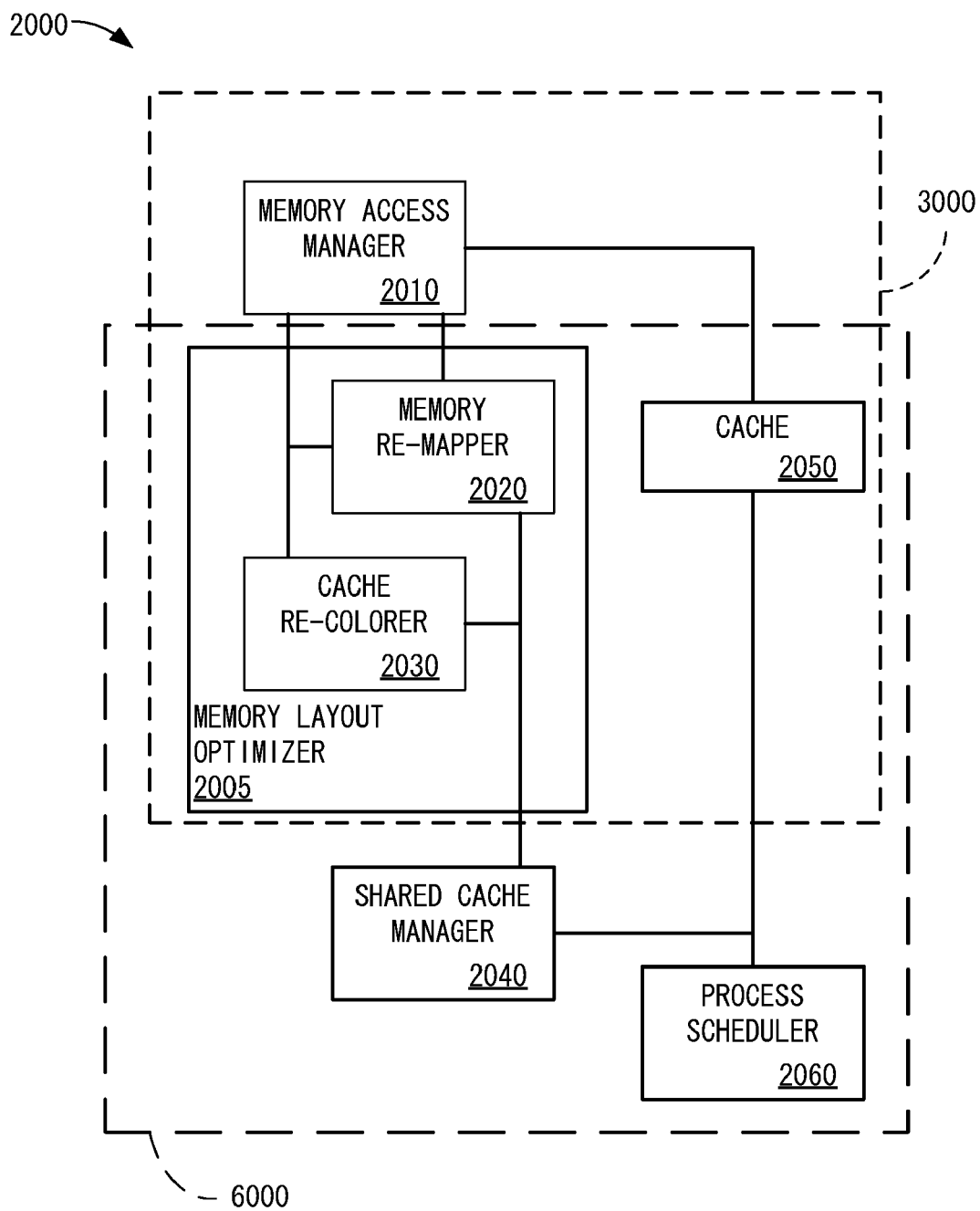
FIG. 2 is a block diagram of components of an exemplary system for utilizing cache information to manage memory access and cache utilization, according to one embodiment of the present invention.

FIG. 2 shows a block diagram of components of an exemplary system 2000 for utilizing cache information to manage memory access and cache utilization, according to one embodiment of the present invention. The following discussion will begin with a description of the structure of the present system 2000 for utilizing cache information to manage memory access and cache utilization. This discussion will be followed with a description of specific components of system 2000. Discussion will turn to description of sub-components of system 2000 used in an exemplary system 3000 and method for managing memory access. Discussion will proceed to description of sub-components of system 2000 used in an exemplary system 6000 and method for managing cache utilization.

Structure

With respect to structure, system 2000 is comprised of a memory access manager 2010, a memory re-mapper 2020, a cache re-colorer 2030, a shared cache manager 2040, a cache 2050, and a process scheduler 2060. It is appreciated that in some embodiments of the present invention, memory re-mapper 2020 and cache re-colorer 2030 are implemented as a single memory remapping element, such as memory layout optimizer 2005, as cache recoloring is one type of memory remapping. However, for purposes of clarity and simplicity of discussion, memory re-mapper 2020 and cache re-colorer 2030 are shown and discussed as separate elements. As shown in FIG. 2, system 2000 is comprised of two separate sub-systems, system 3000 and system 6000, that share some common components. System 3000 is a system for managing memory access. System 3000 utilizes cache metadata to optimize memory access, and is described in detail in conjunction with FIG. 3. System 6000 is a system for managing shared cache access. System 6000 utilizes cache information to optimize utilization of a shared cache, and is described in detail in conjunction with FIG. 6. Finally, though process scheduler 2060 is included in FIG. 2, some embodiments of system 2000 and system 6000 do not utilize process scheduler 2060.

In one embodiment of the present invention, cache 2050 is coupled to memory access manager 2010, shared cache manager 2040, and process scheduler 2060. Memory access manager 2010 is additionally coupled to memory re-mapper 2020, cache re-colorer 2030. Shared cache manager 2040 is additionally coupled to process scheduler 2060, memory re-mapper 2020, and cache re-colorer 2030. It is appreciated that in some embodiments (not illustrated), memory access manager 2010 and shared cache manager 2040 are coupled to one another, coupled to a centralized control, or formed as single entity. However, for purposes of clarity of explanation, functions of cache manager 2040 and memory access manager 2010 are illustrated and described separately.

Memory access manager 2010, of the present invention, directly extracts actual cache metadata from hardware of cache 2050, in one embodiment. Memory access manager 2010 utilizes the cache metadata to optimize memory access by controlling memory re-mapper 2020 to remap memory and cache re-colorer 2030 to recolor cache 2050. The operation of memory access manager 2010 is described in detail in conjunction with FIG. 3, FIG. 4, and FIG. 5.

Shared cache manager 2040, of the present invention, directly and indirectly ascertains information about how a shared cache 2050 is used, in one embodiment. For example, in one embodiment, Memory access manager 2010 utilizes software probing techniques to indirectly determine how cache 2050 is being used, without use of cache metadata provided by cache hardware. Shared cache manager 2040 employs the ascertained cache information to optimize shared utilization of cache 2050 by controlling memory re-mapper 2020 to remap memory and cache re-colorer 2030 to recolor cache. The operation of shared cache manager 2040 is described in detail in conjunction with FIG. 6 and FIG. 7.

Memory re-mapper 2020, of the present invention, remaps portions of memory accessed by cache 2050. Techniques for memory remapping, such as moving (migrating) or copying (replicating) portions of memory from remote locations to closer locations are generally known in the art. Typically, moving comprises copying data from one storage area, such as a memory page on one node, to another location such as a page on another node. The virtual page that is being accessed by a process is then remapped so that it points to the physical page containing the moved data. The old physical page that previously held the moved data may then be deallocated, or unmapped. Typically, replicating comprises copying data from one storage area to a new location or storage area so that a process can access the data from a location that is more local to the process. Replicating is normally done for read-only pages. The location that the memory is copied from is left intact and is not de-allocated. Copy-on-write techniques are then used handle writes to replicated read-only pages.

In embodiments of the present invention, memory re-mapper 2020 employs memory remapping techniques under direction of shared memory access manager 2010, shared cache manager 2040, or both, to move or copy selected portions of memory. In embodiments of the present invention, the selected portions of memory are typically those that memory access manager 2010, shared cache manager 2040, or both have identified as remote memory that is frequently accessed by cache 2050, remote memory that is heavily used in cache 2050, or memory that is stored in a location of a cache that is heavily contended for by multiple processes. Embodiments of the present invention optimize memory access times and system interconnect use by moving or copying the selected portions of memory to a local cache or to a local storage area such as system Random Access Memory (RAM).

Cache re-colorer 2030, of the present invention, is used to accomplish recoloring of memory pages to control which portions or 'colors' of cache 2050 into which they are mapped. In one embodiment, to recolor a page (in a system with a physically indexed cache), cache re-colorer 2030 selects an old page (O) from an over-utilized cache subset and copies its data to a new, free page (N) from a less utilized subset. Cache re-colorer 2030 then changes the virtual address mapping so that the virtual addresses which formerly pointed to page O, now point to page N. Such recoloring is useful to ease contention caused by several processes heavily using one region or particular "color" of a cache. These and other techniques for recoloring cache are generally known in the art and may be employed by cache recolorer 2030. In embodiments of the present invention, cache re-colorer 2030 employs cache recoloring techniques under direction of shared memory access manager 2010, shared cache manager 2040, or both, to dynamically relocate selected data within cache 2050 to reduce cache color contention within cache 2050. In embodiments of the present invention, the selected data are typically data or pages that memory access manager 2010, shared cache manager 2040, or both have identified as subject to heavy cache utilization, such as thrashing, or else are located in areas of a cache that are heavily contended for by multiple processes that share a cache 2050.

Process scheduler 2060, of the present invention, is a pre-existing portion of an operating system (running directly on physical hardware, or running as a guest operating system in a virtual machine). Process scheduler 2060 schedules processing time to multiplex processes on a central processing unit (CPU). When process scheduler 2060 is utilized as a portion of system 2000 or system 6000, shared cache manager 2040 feeds data, such as control inputs, into process scheduler 2060 to manage the scheduling of processes that access shared cache 2050. In an embodiment that utilizes a coupling to process scheduler 2060, the present invention modifies the existing process scheduler in an operating system so that it can receive control inputs from shared cache manager 2040. Shared cache manager 2040 uses this coupling to exploit information about cache 2050 to direct process scheduler 2060 to advantageously schedule multiplexing or simultaneous running of processes that use disjoint or mostly disjoint areas of cache 2050, and are therefore non-conflicting. Likewise, shared cache manager 2040 uses this coupling to advantageously schedule conflicting processes to run separately, when cache information indicates that processes heavily contend for the same regions of cache 2050. This coupling to process scheduler 2060 is especially useful in embodiments of the present invention utilized with processors that have multiple cores and/or multiple simultaneous threads.

Cache 2050, of the present invention, represents one or more virtual machine and/or physical computer system caches coupled to components of system 2000. In some embodiments cache 2050 is an internal processor cache, such as a Level 1 or Level 2 cache in a single-core processor or multi-core processor. In some embodiments cache 2050 is external to a processor such as a Level 3 cache on a motherboard or node in a NUMA (Non-Uniform Memory Access) system. In a NUMA embodiment, cache 2050 might cache only remote data or both remote and local data. In some NUMA embodiments, it is appreciated that a NUMA cache 2050 is a Level 4 cache, since in these embodiments Level 3 cache already exists at the chip level. In some embodiments, cache 2050 is connected to interconnect hardware, such as, for example, a card in a Peripheral Component Interconnect (PCI) slot.

In embodiments of the present invention that use memory access manager 2010, cache 2050 represents one or more computer memory caches which allow software inspection of cache metadata. In some such embodiments, cache 2050 supports a software query for the metadata of a single cache line. In other such embodiments, cache 2050 supports a software query of multiple cache lines at once. In various embodiments of the present invention, cache 2050 provides information such as one or more of the following pieces of cache metadata: a cache tag (which indicates the main memory address that is being cached at this cache index); cache permissions, protocol states of the cache (such as dirty, shared, exclusive, valid, invalid, and etc.); information about which hardware thread or core brought a particular piece of data into the cache; cache miss data (such as from a hardware performance counter); and, in a set-associative cache, information regarding the set in which cache data resides and/or any associated least recently used (LRU) or most recently used (MRU) state.

In one embodiment, cache 2050 allows dumping of the cached data itself, while in another embodiment it does not. In one embodiment, cache 2050 optionally includes a feature to allow direct invalidation of one or more cache entries. In one embodiment comprising a system with multiple levels of cache, each level of cache 2050 in the hierarchy can be individually queried. In one embodiment comprising a multi-level cache 2050, the multi-level cache 2050 supports an inclusion property such that all lines in a smaller, lower-level cache are included in the larger, higher-level caches.

A cache tag is a numerical identifier that can be translated into the virtual or physical address of a portion of memory (a cache line, a page, or other unit). The translation from tag to address may require lookup in a hardware-managed or software-managed table. A cache tag may include an address space identifier (ASID) to associate the virtual address with the process that loaded the memory. In a NUMA system, a cache tag not only allows the unique determination of memory address(es) being cached in a cache line associated with a cache tag, but also allows unique determination of the NUMA node which that memory is associated with (i.e., the NUMA node for which this is local memory). Similarly, given a memory address (and static details about the cache hardware) information about cache "color" can be computed. Another way of saying this is that cache color and NUMA node information are typically specified by a subset of the bits in the memory address.

In embodiments of the present invention that use shared cache manager 2040, cache 2050 represents one or more shared caches, such as a node cache, a single-core processor cache, a multi-core processor cache, a cache in a simultaneous multi-threading processor, and/or a cache shared simultaneously or sequentially by a plurality of traditional or virtual machine processes. In some embodiments that use shared cache manager 2040, cache 2050 does not allow software inspection of cache metadata. In other such embodiments utilizing shared cache manager 2040, cache 2050 allows some level of software inspection of cache metadata, as described above.

In the present invention, a process comprises any software-manageable encapsulation of a runnable unit of code and its state, such as: a standard (traditional) process, task, or job within an operating system; a thread or "lightweight process" within an operating system; a virtual central processing unit (CPU); and/or a virtual machine monitor (VMM).

Exemplary Methods of Operation

Figure 4:
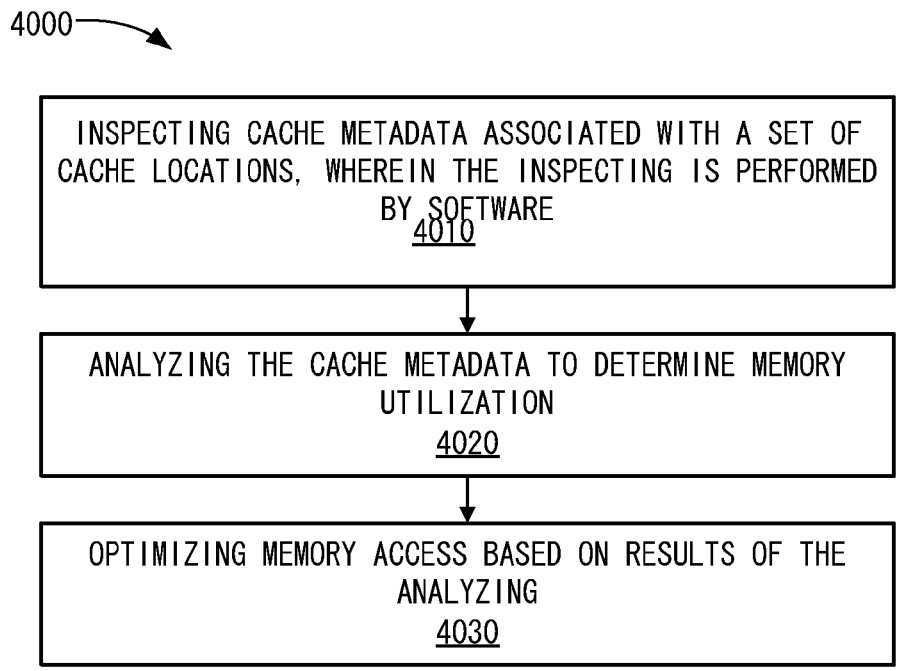
FIG. 4 is a flow diagram of a method for utilizing cache metadata to optimize memory access, according to one embodiment of the present invention.
Figure 7:
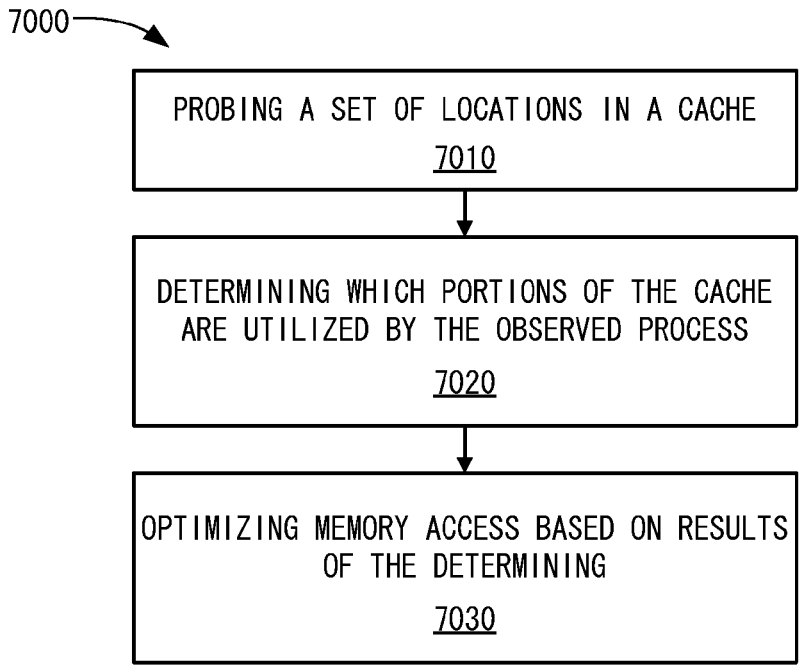
FIG. 7 is a flow diagram of a method for optimizing utilization of a shared cache, according to one embodiment of the present invention.

The following discussion sets forth in detail the operation of present technology for managing memory access and shared cache utilization. With reference to FIGS. 4 and 7, flow diagrams 4000 and 7000 each illustrate exemplary steps used by various embodiments of the present invention. Flow diagrams 4000 and 7000 include processes that, in various embodiments, are carried out by a physical or virtual processor under the control of computer-readable and computer-executable instructions. The computer-readable and computer-executable instructions reside, for example, in data storage features such as computer usable volatile memory 8008, computer usable non-volatile memory 8010, and/or data storage unit 8012 of FIG. 8. The computer-readable and computer-executable instructions are used to control or operate in conjunction with, for example, processor 8006A and/or processors 8006A, 8006B, and 8006C of FIG. 8. Although specific steps are disclosed in flow diagrams 4000 and 7000, such steps are exemplary. That is, embodiments are well suited to performing various other steps or variations of the steps recited in flow diagrams 4000 and 7000. It is appreciated that the steps in flow diagrams 4000 and 7000 may be performed in an order different than presented, and that not all of the steps in flow diagrams 4000 and 7000 may be performed.

Using Cache Metadata to Manage Memory Access

Figure 3:
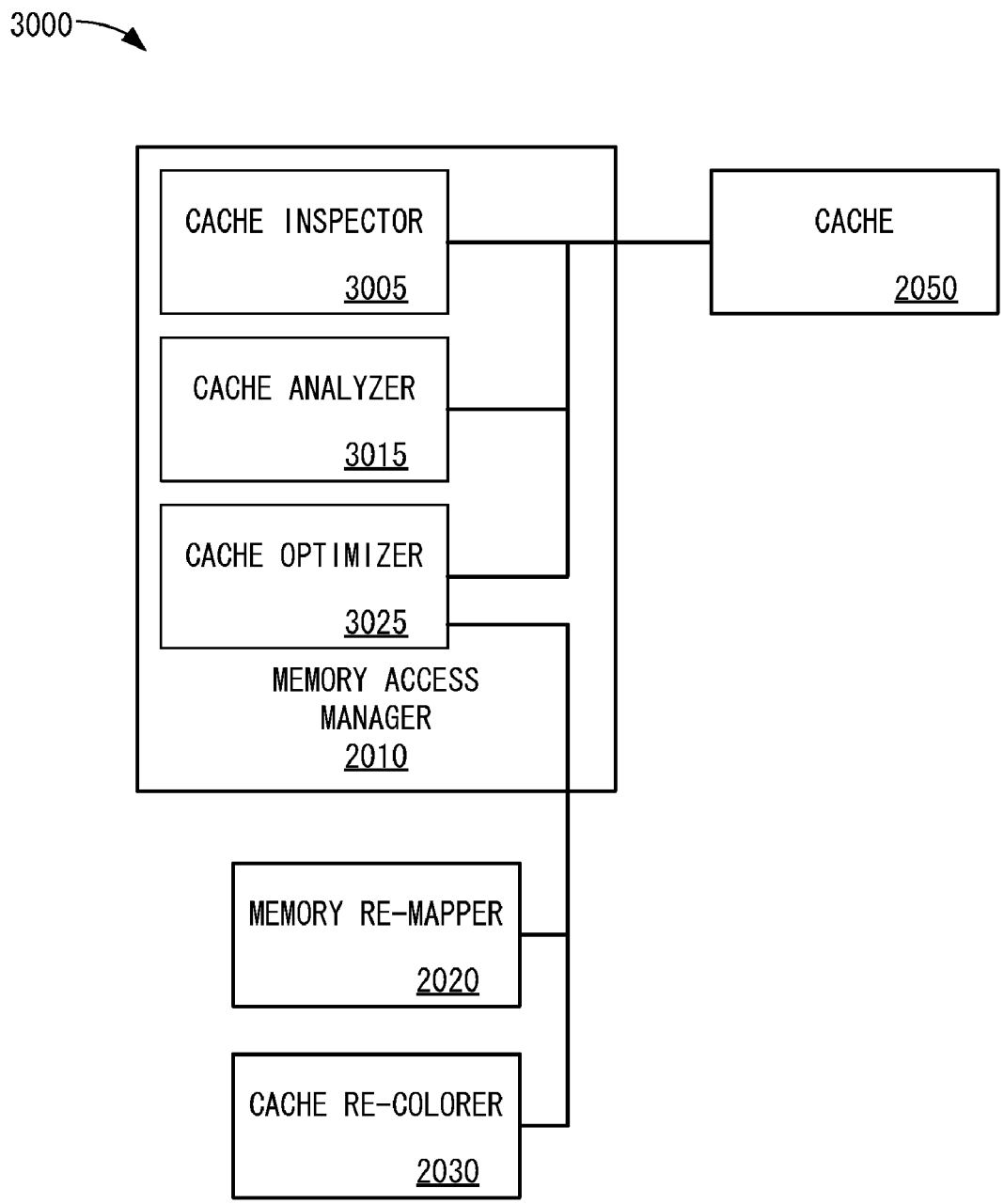
FIG. 3 is a block diagram of components of an exemplary system for utilizing cache information to manage memory access, according to one embodiment of the present invention.

FIG. 3, shows a detailed block diagram of an exemplary system 3000 that uses cache metadata to optimize memory access, according to one embodiment of the present invention. System 3000 is comprised of memory access manager 2010, which is configured to couple to cache 2050, memory re-mapper 2020, and cache re-colorer 2030, all previously described. Memory access manager 2010, of the present invention, extracts cache metadata from hardware of cache 2050 and uses the cache metadata to optimize memory access in a system that cache 2050 is a part of. Memory access manager 2010 is comprised of a cache inspector 3005, a cache analyzer 3015, and a cache optimizer 3025, which are all coupled to one another and to cache 2050. Cache optimizer 3025 is also coupled to memory re-mapper 2020 and cache re-colorer 2030. Operation of components of memory access manager 2010 and system 3000 will be described in conjunction with FIG. 5, and flow diagram 4000 of FIG. 4.

FIG. 4, is a flow diagram 4000 of an exemplary method of the present invention that uses cache metadata to optimize memory access. Embodiments of system 3000 and the method illustrated by flow diagram 4000 are operational on both physical and virtual machines.

Figure 5:
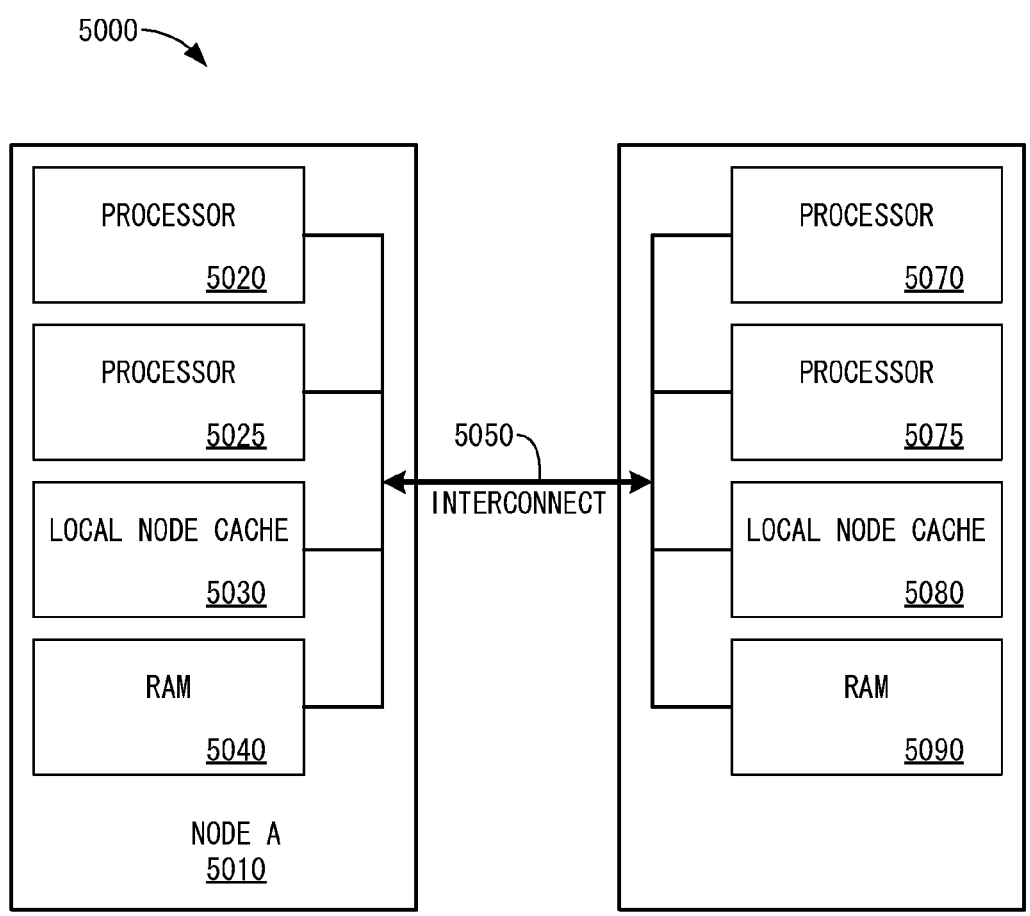
FIG. 5 is a block diagram of an exemplary nodal system upon which embodiments of the present invention may be practiced.

In 4010 of FIG. 4, in one embodiment, cache inspector 3005 of the present invention inspects cache metadata associated with a set of cache locations. As part of this inspection, cache inspector 3005 receives cache metadata from hardware of cache 2050, which is configured to provide metadata to software applications. In some embodiments, hardware of cache 2050 automatically supplies or makes this cache metadata available to cache inspector 3005. In other embodiments, hardware of cache 2050 only supplies this cache metadata to cache inspector 3005 upon a request of a specific set of cache metadata that cache inspector 3005 supplies to the cache hardware of cache 2050. Various types of cache metadata have been previously described, and can comprise information, such as: a cache tag of a cache location, a recency of use status of a cache location (LRU or MRU for example), a protocol state of a cache location, or other cache metadata information. Metadata received by cache inspector 3005 is passed to cache analyzer 3015. In one embodiment of the present invention, cache 2050 is a cache on a commodity processor that has hardware configured to provide elements of cache information to software. In another embodiment of the present invention, cache 2050 is a node cache in a NUMA node that has hardware configured to provide elements of cache information to software. Such an embodiment is illustrated in FIG. 5, which is described below.

In 4020 of FIG. 4, in one embodiment, cache analyzer 3015 of the present invention analyzes the cache metadata to determine memory utilization supported by cache 2050. In one embodiment, this analysis comprises periodically inspecting refreshed metadata associated with a set of cache locations to determine changes in the set of memory locations stored in the cache. For instance, such periodic inspection can be accomplished every 10 milliseconds, every 50 milliseconds, or at some other periodic interval. One such embodiment employs statistical techniques to analyze changes and trends in remote memory utilization that occur in the inspected cache metadata over time. Results of analyses performed by cache analyzer 3015 are passed to cache optimizer 3025.

In one embodiment, cache analyzer 3015 of the present invention determines an amount of space utilized in cache 2050 by one or more particular sets of remote memory locations that are stored in cache 2050. Cache analyzer 3015 performs this determination through comparisons, statistical techniques, estimations, and/or approximations. For example, in one embodiment, cache analyzer 3015 compares space used by a particular set of remote memory locations to the space used by other remote memory locations and/or to predetermined standards. Based on such comparisons, cache analyzer 3015 determines whether it is suitably advantageous to locally store the information instead of referencing remotely stored information.

In one embodiment, cache analyzer 3015 of the present invention determines a comparative frequency of use of remote memory locations stored in cache 2050. In such an embodiment, cache analyzer 3015 tracks the frequency that particular remote memory locations are stored in inspected cache locations. In one embodiment, cache analyzer 3015 of the present invention tracks how frequently particular data are used by examining LRU metadata from cache 2050. Cache analyzer 3015 employs memory use algorithms and/or compares this frequency information against predetermined guidelines or against the frequency of other storage of other remote memory locations. Based on results of such algorithms and/or comparisons, cache analyzer 3015 determines if a particular remote memory location or piece of data is accessed frequently enough that it is suitably advantageous to store the information locally instead of repeatedly accessing it remotely.

In one embodiment, cache analyzer 3015 of the present invention determines a cache utilization rate for a particular set of cache locations. Cache analyzer 3015 monitors cache information that is stored in and evicted from the monitored location over time. Cache analyzer 3015 then determines if it is suitably advantageous to remap heavily used data to a different cache color to improve the utilization of cache 2050. Cache analyzer 3015 makes this determination based on the previously described monitoring and based on a comparison to a predetermined utilization rate standard. As part of cache utilization analysis and other cache analysis, some embodiments of cache analyzer 3015 are capable of sending a software command to cache 2050 which will forcibly evict data from a cache location. Similarly, some embodiments of cache analyzer 3015 are also capable of referencing a known memory address to insert the contents of the memory address into a particular location of cache 2050. These capabilities are useful for setting a cache location to a known state so that changes in the cache location can be easily monitored and analyzed. For instance, utilization rates and recency of use information can be determined by calculating how long it takes for a known memory address to be changed or evicted from a cache location by processes that use cache 2050.

In 4030 of FIG. 4, cache optimizer 3025 of the present invention optimizes memory access based on results of the cache analyses performed by cache analyzer 3015, in one embodiment. Cache optimizer 3025 sends control inputs to memory re-mapper 2020, cache re-colorer 2030, or both to carry out the optimization of memory access. In one embodiment of the present invention, cache optimizer 3025 directs memory re-mapper 2020 to remap remote information to local storage, such as local RAM, to improve locality of data storage. This local storage is useful, for instance, for information determined by cache analyzer 3015 to have a high degree of occupancy in cache 2050 or a high frequency of access in cache 2050. In one embodiment, cache optimizer 3025 directs cache re-colorer 2030 to dynamically relocate data within cache 2050. This is relocation is useful, for instance, to recolor cache data when cache analyzer 3015 determines that the data is subject to an overly high utilization rate. Such relocation reduces the cache miss rate and improves overall utilization of cache 2050.

In one embodiment, cache optimizer 3025 improves locality of memory access by preferentially scheduling an observed process on a node that has been determined to contain data frequently accessed by said process. In such an embodiment, cache optimizer 3025 communicates with the operating system or process scheduler 2060 through a coupling (not shown) to these systems for carrying out this preferential scheduling. In such an embodiment, instead of moving memory to be closer to a process, cache optimizer 3025 instead preferentially moves the process closer to the memory. Such preferential scheduling is commonly known in the art as an alternative or complement to memory remapping. In one embodiment, cache optimizer 3025 reports information, to a user or a higher-level program to facilitate optimization tasks directed by the user and/or by higher-level programs to tune the performance of a computer system. Reported information comprises information such as: results of analysis from cache analyzer 3015, cache utilization information, and a cache heat map that includes utilization/miss statistics for each cache line and/or color. In one embodiment, this information reporting comprises an application programming interface (API) through which higher-level programs can obtain this information. In another embodiment, the information reporting comprises a facility for recording this information in a user-readable log file.

FIG. 5 is a block diagram of an exemplary nodal system 5000 upon which embodiments of the present invention, such as system 3000 and the method illustrated by flow diagram 4000, may be practiced. FIG. 5 shows two nodes, Node A 5010 and Node B 5060, connected by interconnect 5050. Two nodes, with two processors per node, are shown for simplicity of explanation. However it is appreciated that system 5000 is extensible to encompass many more such interconnected nodes, and nodes with more or less than two processors. For purposes of example, and not limitation, Node A 5010 and Node B 5060 represent NUMA nodes, and interconnect 5050 represents a NUMA interconnect. Node A 5010 is comprised of a first processor 5020, a second processor 5025, a local node cache 5030, and a main memory RAM 5040 or similar local storage. Likewise, Node B 5060 is comprised of a first processor 5070, a second processor 5075, a local node cache 5080, and a main memory RAM 5090 or other similar local storage. Local node cache's 5030 and 5080 are small (such as, for example, 32 MB) in comparison to main memory RAMs 5040 and 5090 which may have hundreds or thousands of times more storage capacity (such as, for example, 64 GB). Similarly, processors 5020, 5025, 5070, and 5075 have associated caches that are also small in comparison to the size of RAMs 5040 and 5090. Additionally in embodiments of the present invention, local node caches 5030 and 5080 and/or caches of processors 5020 and 5070 support software inspection of cache metadata.

In operation of system 5000, processor 5020 of Node A 5010 is able to access memory stored at Node B 5060. This is useful, however, because of the relatively small size of nodal cache 5030, memory access can be time consuming if a large amount of memory at Node B 5060 frequently needs to be accessed remotely. This is because the small size of local node cache 5030 can be inadequate to store the large amount of frequently accessed data. Through the processes of cache inspection, as described at 4010 of FIG. 4, cache inspector 3005 inspects metadata, such as cache tags of cache lines, of local node cache 5030. Through the processes of cache analysis, as described at 4020 of FIG. 4, cache analyzer 3015 analyzes the metadata, such as cache tags, to determine which remote memory addresses are being frequently accessed by processor 5020. The results of this analysis are used by cache optimizer 3025, to initiate the processes of optimizing memory access, as was described at 4030 of FIG. 4. Accordingly, cache optimizer 3025 directs memory re-mapper 2020 to move the identified data to local storage, such as RAM 5040, so that processor 5020 can access the data locally rather than remotely. In this fashion, system 3000 and process 4000 operate to reduce bandwidth use on NUMA interconnect 5050, eliminate the increased latency associated with accessing the identified data remotely, and decrease demands upon local NUMA node cache 5030 so that it operates more efficiently. Moreover, the above illustrated example of the optimization of memory access of system 5000 is similar for embodiments using other cache metadata for analysis. The illustrated example is also similar for embodiments inspecting other types of caches (such as the cache of processor 5020 or other previously described caches) and for embodiments using other analysis and optimization techniques that have been previously described.

Using Cache Information to Manage Shared Cache Utilization

For the purposes of this discussion, the term "multi-threaded processor" is used to refer to either a multi-core central processing unit (CPU) with some level of shared cache or a Simultaneous Multi-Threading (SMT) CPU with some level of shared cache. The sub-units (e.g. cores or hardware threads) are referred to as logical processors. A "cache subset" should be understood to mean any interesting, manageable sub-unit of the cache, which may be a page color in the traditional sense (the set of pages whose lines all map to the same region of the cache by virtue of the fact that their low order page number bits match the high order bits of the cache indices in this subset). "Processes" comprise any software-manageable encapsulation of a runnable unit of code and its state, such as: a standard (traditional) process, task, or job within an operating system; a thread or "lightweight process" within an operating system; a virtual central processing unit (CPU); and/or a virtual machine monitor (VMM).

One embodiment of the present invention detects each process' utilization of each cache color using software probes. On a multithreaded processor, a probe is a piece of code that runs on one logical processor while the other logical processor(s) are executing one or more processes that are being observed. To obtain a single sample, the probe selects a single cache subset, S, and repeatedly access one or more memory addresses that map to subset S of the cache. Each time a memory address is accessed, it will either be in the cache already (a hit), or it will need to be fetched from memory (a miss). Elements of the present invention determine misses either by measuring the amount of time necessary to fetch data from the memory address (since misses are much slower than hits) or by reading a hardware performance counter of the processor or cache that increments based on occurrence of a relevant event in cache 2050 (such as, for example, a cache hit or miss) or in a memory system associated with said cache 2050 (such as, for example, a message sent out to the memory bus). Either approach can be used in batch form (i.e. one timing determination or one counter read for several cache accesses by the probe).

After the present invention causes the probe data to be brought into the cache for the first time, there should be no misses unless another logical processor has accessed the same portion of the cache and caused some of the probe data to be evicted (this is true when the probe data are used on a single processor so there are no cache invalidations due to multiprocessor coherency issues). Elements of the present invention observe the number of misses over a given interval to estimate the examined processes' utilization of cache subset S. In some embodiments, the probe varies the number of cache lines accessed per cache index in order to measure the associativity required to hold all the lines of the examined process' working set. For instance, if the cache is eight-way associative, it may be the case that the process will only access two lines within a particular cache index. In such a case, if the probe accesses seven lines within that cache index, it will observe misses. However, if the probe accesses only six lines within that cache index, it will not observe misses. The information gathered by this technique of the present invention is extremely useful in determining which processes can "fit" together with minimal conflicts. In one embodiment using this technique, the present invention also obtains pre-index contention statistics in addition to per-subset contention statistics.

In one embodiment, the present invention uses this probe technique on a non-multithreading processor. For example, the present invention interfaces with the operating system to interrupt a process (for example, with a non-maskable interrupt), and accesses the probe data as previously described. Alternatively, rather than interrupting a process, the present invention interfaces with the operating system to access the probe data when the process is descheduled or interrupted by the operating system for other reasons. Elements of the present invention determine the number of cache evictions since the last sample by measuring the number of cache misses observed (as previously described).

The present invention uses additional techniques, as required, to determine which of several processes is causing conflict misses, when probing a multithreaded processor with more than two logical processors. For example, in one embodiment, the present invention suspends the execution of several hardware threads during the sampling interval to simplify analysis. In one embodiment, instead of reading the performance counter on the probe's logical processor, the present invention reads performance counters on all the other logical processors while at the same time aggressively accessing data within a given subset, S, of the cache. This interference type probing will greatly increase the number of misses observed on a logical processor that heavily utilizes the subset S, but has a lesser effect on logical processors that are not utilizing subset S.

All of these probing techniques of the present invention produce the same result, a per-process description of cache subset utilization. Elements of the present invention then utilize this information to intelligently reduce the occurrence of conflict misses, such as, by controlling memory mapping to preferentially allocate future pages from cache subsets that are known to be under utilized and/or by advantageously controlling a process scheduler to ensure that non-conflicting access patterns run together (either simultaneously on a multithreaded type processor or sequentially on any processor type).

In one embodiment, the present invention also recolors pages in response to contention that is discovered as a result of software probing. To recolor a page (in a system with a physically indexed cache), the system selects an old page (O) from an over-utilized cache subset and copies its data to a new, free page (N) from a less utilized subset. The system then changes the virtual address mapping so that the virtual addresses which formerly pointed to page O, now point to page N.

In one embodiment, the present invention also remaps some pages that are discovered to be heavily used as a result of software probing or cache metadata inspection. At a high level, there are two steps involved. The first step is obtaining cache utilization statistics via metadata inspection or cache probing. Techniques for performing this first step have been previously described, and they will typically identify a set of physical addresses/pages/colors that are overused. The second step is locating the virtual pages associated with processes that map to these overused physical addresses/pages/colors. This second step typically produces a set of virtual addresses/pages that map to the physical addresses/pages found in the first step. The present invention finds these heavily used pages through use of novel virtual memory techniques and standard virtual memory techniques that are known in the art. The present invention uses these techniques to identify which virtual page corresponds to a physical page that was identified as being in an over-utilized cache subset. For example, in one embodiment, in a system using binary translation (BT), such as certain types of virtual machines, elements of the present invention use a novel technique to observe addresses being accessed and use this information to identify the page location of the addresses being accessed.

In one embodiment, such as, for example a system without BT, elements of the present invention use a novel technique to interrupt a running process and scan its registers and relevant memory locations (such as the stack) for addresses that are currently in use. In one embodiment, the present invention uses a well known technique to examine the "accessed bits" on the page table entries for pages of an identified over-utilized cache subset. In one embodiment, the present invention also uses a well known technique to remove page table mappings for pages of an identified over-utilized cache subset, thus taking a page fault that will identify a page in use. In one embodiment, on a processor with a software visible or software managed TLB, the present invention uses a well known technique to examine the TLB entries to determine which pages are currently in use.

In other embodiments, where cache metadata inspection (for example inspection of cache tags) is not possible, elements of the present invention exploit a system's cache coherency hardware to identify hot pages. For example, a remote processor in the same cache coherency domain as the one executing the process under observation can load data from many different pages into its cache. If the process under observation writes to one of these cache lines, it will cause an invalidation, and the remote processor will observe a cache miss when it attempts to re-access the same cache line. This detection of cache misses can utilize the techniques described previously, such as timing the cache access or examining a hardware performance counter. Embodiments of the present invention combine these techniques, as required, with the previously described virtual memory techniques to obtain greater probing accuracy. For example, in one embodiment, after finding several candidate addresses in the stack of a process, the present invention clears the accessed bits on the corresponding page and later re-examines them for changes.

Figure 6:
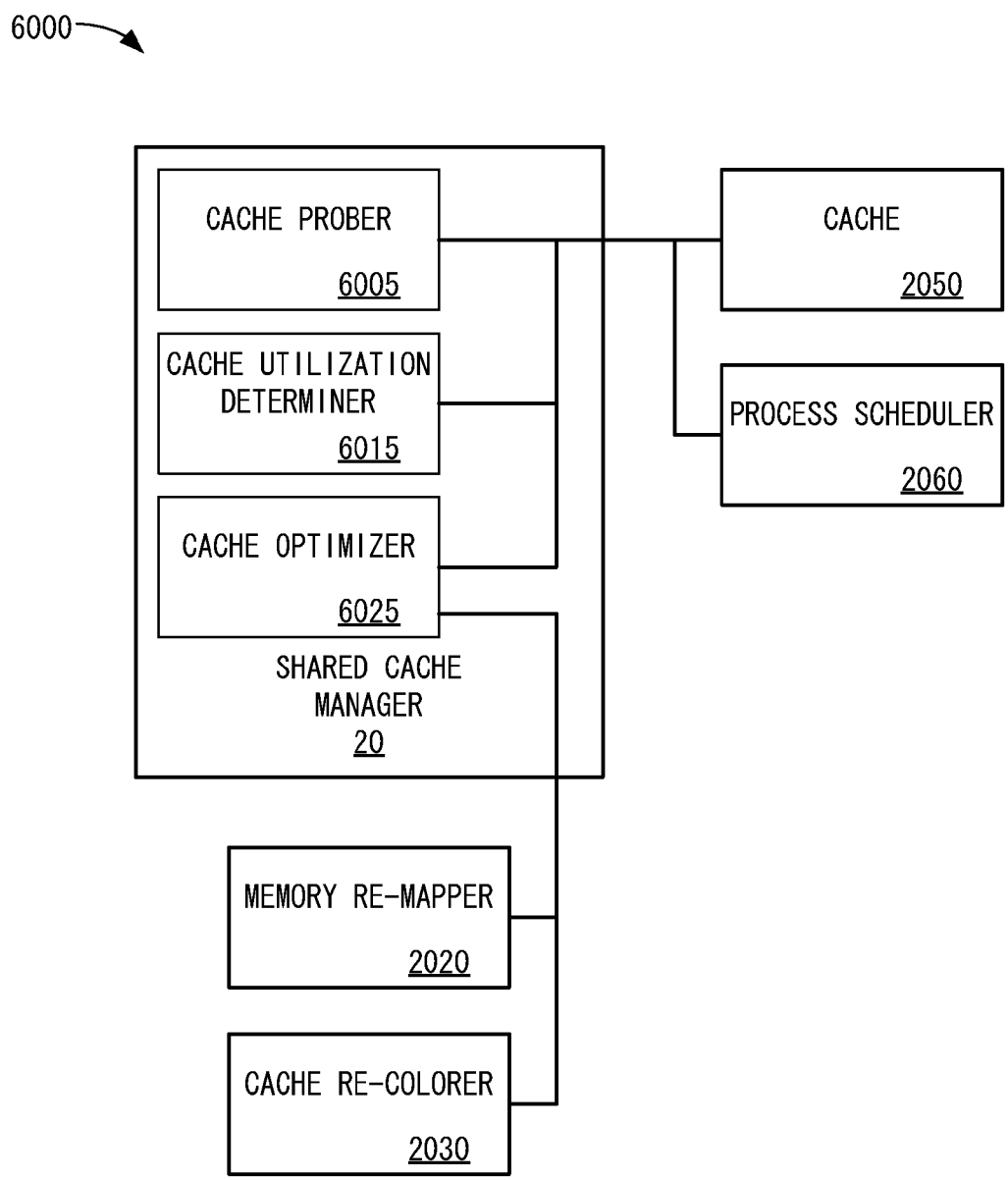
FIG. 6 is a block diagram of components of an exemplary system optimizing utilization of a shared cache, according to one embodiment of the present invention.

FIG. 6, shows a detailed block diagram of an exemplary system 6000 for optimizing utilization of a shared cache, according to one embodiment of the present invention. System 6000 is comprised of shared cache manager 2040, which is configured to couple to cache 2050, memory re-mapper 2020, and cache re-colorer 2030, all previously described. Shared cache manager 2040 is configured to couple to cache 2050, either directly or through an operating system, for ascertaining cache information related to shared cache 2050 and employing the ascertained cache information for optimizing shared utilization of cache 2050. Shared cache manager 2040 is comprised of cache prober 6005, cache utilization determiner 6015 and cache optimizer 6025, which are all coupled to one another and to cache 2050. Cache optimizer 6025 is also coupled to memory re-mapper 2020 and cache re-colorer 2030. Operation of components of shared cache manager 2040 and system 6000 will be described in conjunction with flow diagram 7000 of FIG. 7.

FIG. 7 is a flow diagram 7000 of the present invention that optimizes utilization of a shared cache 2050. Embodiments of system 6000 and the method illustrated by flow diagram 7000 are operational with both physical and virtual shared caches. In various embodiments, cache 2050 comprises caches such as shared caches in physical or virtual multi-threading processors, shared caches in physical or virtual multi-core processors, or other types of shared physical or virtual caches. In some embodiments, cache 2050 also comprises a temporally shared cache, such as, for example, where one logical processor switches back and forth between different processes, which can conflict in the temporally shared cache by evicting each other's data. Embodiments of system 6000 and the method illustrated by flow diagram 7000 are particularly useful with commodity type processors which offer very little or no software access to metadata of their caches.

In 7010 of FIG. 7, in one embodiment, cache prober 6005 of the present invention probes a set of locations in cache 2050. The probing is performed while one or more observed processes are running, descheduled, or interruped. For example, in one embodiment, cache prober 6005 accesses the set of locations at approximately the same time that the observed process is accessing cache 2050. On a multi-threaded processor, cache prober 6005 can perform the probing simultaneously with the running of an observed process. On a non-multi-threaded processor, cache prober 6005 accomplishes the probing by directing the operating system to interrupt the observed process. As an example, cache prober 6005 can direct the operating system to issue a non-maskable interrupt to interrupt the observed process so that the probing can take place. On a multi-threaded computer chip with more than two processors, several hardware threads can be suspended by cache prober 6005 during the probing to simplify data collection and analysis.

In embodiments of the present invention, an observed process comprises any software-manageable encapsulation of a runnable unit of code and its state, such as: a standard (traditional) process, task, or job within an operating system; a thread or "lightweight process" within an operating system; a virtual central processing unit (CPU); and/or a virtual machine monitor (VMM). In embodiments observing multiple processes, a combination of the identified processes may be observed. For example, in one embodiment, an observed process is a virtual processor associated with a virtual machine.

In one embodiment, cache prober 6005 of the present invention runs a piece of code to repeatedly access one or more memory addresses that map to a subset of cache 2050, to perform probing. This causes cache 2050 to repeatedly attempt to supply information from the accessed memory addresses. In one embodiment, the code can be varied to access memory addresses that map to various subsets of cache 2050. Information obtained by cache prober 6005 as part of probing 7010 is passed to cache utilization determiner 6015. By observing the number of cache misses (due to access by the observed process or access by cache prober 6005) cache prober 6005 identifies how heavily the probed portion of cache 2050 is utilized. In one embodiment, cache prober 6005 utilizes multiple versions of the piece of code (probing code) such that the probing code itself and associated local data (such as stack variables) always reside in a different cache line/color that the one being probed. This allows cache prober 6005 to avoid having the probing code itself interfere with the cache portion being probed.

In one embodiment, cache prober 6005 uses such repeated access to measure the elapsed time required to fetch the requested data from the accessed memory addresses via cache 2050. Cache prober 6005 infers hits and misses by tracking and comparing the elapsed fetch times from repeated accesses. In one embodiment, cache prober 6005 measures elapsed fetch times for a pre-determined period, and statistically analyzes this measured data to determine which fetches are cache hits or misses. For example, in one embodiment, cache prober 6005 infers cache hits from elapsed access times that statically cluster around a shorter mean elapsed time as measured over a period of time. Likewise, in one embodiment, cache prober 6005 infers cache misses from elapsed times that exceed the shorter mean elapsed time by some predetermined amount.

In one embodiment, cache prober 6005 simply associates cache misses with fetches that exceed a pre-specified amount of time to process, since the latency difference between a cache hit and a cache miss is typically one or two orders of magnitude. For example, a Level 2 cache hit may take about ten cycles (alternatively 5 nanoseconds on a 2 GHz processor) while a Level 2 cache miss that must go all the way to main memory may take about 200 cycles (approximately 100 nanoseconds on a 2 GHz processor). Thus, in one embodiment, cache prober 6005 infers that any fetch latency that exceeds a pre-determined latency (such as, for example, 50 processor cycles worth of time) is associated with a cache miss.

In the present invention, such statistical and comparative inferences are possible because of the latency that is experienced when cache 2050 is required to retrieve data following a cache miss, due to the data not being present in the cache. Note that after probe data has been brought into cache 2050 for the first time, there should be no cache misses unless another process or processor has accessed the same portion of cache 2050 and caused some of the probe data to be evicted.

Cache prober 6005, of the present invention, also varies the number of cache lines accessed per cache index in order to measure the associativity required to hold all the lines of the working set of the observed process, in one embodiment. For instance, if cache 2050 is eight-way associative, it may be the case that the observed process will only access two lines within a particular cache index. In such a case, cache prober 6005 will observe misses by accessing seven lines within the cache index of cache 2050. However, if cache prober 6005 only accessed six lines within that cache index, no cache misses would be observed.

In one embodiment of the present invention, cache prober 6005 reads cache related data, such as a count from a hardware performance counter of the processor or of cache 2050 that increments based on the occurrence of relevant events in cache 2050 (such as, for example, cache hits and/or misses) or in memory systems associated with cache 2030 (such as, for example, a message sent out to a memory bus). Such hardware performance counters are available even on commodity processors, including Intel x86 type processors. In one such embodiment, cache prober 6005 reads the cache data following each repeated access of memory addresses that map to a subset of cache 2050.

In 7020 of FIG. 7, in one embodiment, cache utilization determiner 6015 determines which portions of cache 2050 are utilized by the observed process that was running during the operation of cache prober 6005. In one embodiment, cache prober 6005 marks the cache locations associated with the memory addresses accessed by cache prober 6005 as being used by the observed process if cache misses are measured in those cache locations. In one embodiment, cache prober 6005 performs the probing on multiple observed processes to check for cache misses at multiple locations (or throughout the entire cache). This allows cache utilization determiner 6015 to determine which areas of cache 2050 are used by each observed process. Likewise, cache utilization determiner 6015 determines which processes access conflicting areas of cache 2050. In some embodiments, cache utilization determiner 6015 calculates a cache utilization rate, such as a thrashing rate eviction rate, or miss rate, for a contended for subset or portion of cache 2050. The cache utilization rate is calculated, in one embodiment, from cache miss data obtained when cache prober 6005 observes multiple processes, either individually or simultaneously.

In one embodiment of the present invention, cache utilization determiner 6015 uses data from repeated samplings of shared cache 2050 by cache prober 6005 to estimate a time until a probable cache miss. In various embodiments, cache location determiner 6015 performs this estimate for a single cache color, for multiple cache colors, or for all cache colors of shared cache 2050. Likewise, in various embodiments, cache utilization determiner 6015 performs this estimate for a single cache location (such as a cache line), multiple cache locations, or all cache locations in shared cache 2050. For example, in one embodiment, cache utilization determiner 6015 estimates the time, in microseconds, until a fifty percent probability of a cache miss will occur for each color of shared cache 2050. In one embodiment, such estimations are passed to cache optimizer 6025.

In some embodiments of the present invention, cache utilization determiner 6015 also uses standard and novel virtual memory techniques, cache metadata inspection techniques (when available), and other previously described techniques to determine virtual addresses of data and pages that are heavily utilized, and thus are good candidates for remapping. In one embodiment, for example, cache utilization determiner 6015 examines the "accessed bits" on the page table entries for pages of subset of cache 2050 that it has determined to be heavily used, based on analysis of data collected by cache prober 6005. In one embodiment, cache utilization determiner 6015 removes the page table mappings for pages that belong to a cache subset that it has marked as over utilized. This causes a page fault that allows cache utilization determiner 6015 to identify a page in use. In one embodiment, on a processor with a software-visible or software-managed TLB, cache utilization determiner 6015 examines TLB entries to determine which pages are currently in use.

In one embodiment, in a system using binary translation (BT), such as many virtual machines, cache utilization determiner 6015 interfaces with the BT mechanism to observe addresses being accessed, and then uses these addresses to identify pages being accessed. In one embodiment, without BT, cache utilization determiner 6015 interrupts a running process and scans its registers and relevant memory locations (such as the stack) for addresses that are currently in use. Cache utilization determiner 6015 then interfaces with the system's cache coherency hardware to identify hot pages that are heavily accessed, in a manner that has been previously described. In one embodiment, these techniques are also used by cache analyzer 3015 of system 3000 to identify addresses of data or pages that are candidates for remapping.

In 7030 of FIG. 7, in one embodiment, cache optimizer 6025 optimizes utilization of cache 2050 based on results of cache utilization determinations performed by cache utilization determiner 6015. In various embodiments, cache optimizer 6025 improves scheduling of processes, mapping of memory, coloring of cache 2050, or some combination to optimize utilization of cache 2050.

In one embodiment, cache optimizer 6025 compares cache utilization results, such as which portion of cache 2050 is accessed, for a plurality of observed processes. Cache optimizer 6025 determines which of the plurality of observed processes have completely or substantially non-conflicting cache access patterns, based on this comparison of cache utilization results. For example, processes that are determined to have a conflict level below a predetermined threshold are labeled considered to be non-conflicting. In one embodiment, cache optimizer 6025 then directs process scheduler 2060 (previously described) to advantageously schedule combinations of non-conflicting processes to run together. This technique is particularly useful on a multi-threaded processor or multi-core processor with a shared cache, where scheduler 2060 can be directed to preferentially execute applications on the same shared cache package at the same time if they are known to use different portions of subsets of cache 2050. However, on any processor, scheduler 2060 can be directed to context switch back-to-back between two applications that do not overtax the same portions of cache 2050.

In one embodiment, cache optimizer 6025 also determines which of the plurality of observed processes have conflicting cache access patterns, based on this comparison of utilization rates. While many processes will have some conflicting cache access patterns, cache optimizer 6025 determines which processes exceed a pre-defined level of conflict that will warrant remapping memory, recoloring cache, or rescheduling processes in order to gain substantial efficiency improvements in the operation of cache 6026. Conflicting processes that exceed this pre-defined level of conflict are marked as having high contention.

In one embodiment, cache optimizer 6025 then directs process scheduler 2060 to run these high contention processes independent of one another to optimize cache access times and reduce contention. In another embodiment, cache optimizer directs memory re-mapper 2020 (previously described) to remap data accessed by one or more of the high contention processes, such that the contention is reduced or eliminated when the high contention processes run simultaneously. In yet another embodiment, cache optimizer 6025 directs cache re-colorer 2030 (previously described) to recolor contended for pages of cache 2050 to reduce or eliminate the contention experienced when the high contention processes run simultaneously. For example, on a processor with a physically indexed cache 2050, cache re-colorer 2030 can be directed to remap a physical page from an underutilized portion or subset of cache 2050 to take the place of a previously mapped physical page that maps to an overtaxed portion or subset of cache 2050.

In one embodiment, cache optimizer 6025 receives information from cache utilization determiner 6015 about the frequency with which an observed process displaces cache information from a location or set of location in cache 2050. This information can be inferred from a cache miss rate that cache prober 6005 measures for a location or set of locations in cache 2050 while an observed process is running, descheduled, or interrupted. If the cache miss rate exceeds a pre-established threshold, such data is deemed to be very frequently accessed. In one embodiment, cache optimizer 6025 utilizes this information to direct memory re-mapper 2020 to re-map these very frequently accessed portions of cache to local storage, if it is determined that cache 2050 is obtaining the data from a remote location.

In one embodiment, cache optimizer 6025 receives address locations from cache utilization determiner 6015 for data and/or pages that are accessed by a subset of cache 2050 that has been identified by the present invention as heavily accessed. Cache optimizer 6025 employs this information to direct memory re-mapper 2020 to remap the data and/or pages such that the next time the data and/or pages are accessed they will map to a different subset of cache 2050.

In one embodiment, cache optimizer 6025 responds to the detection of a highly contended for cache color by directing a memory allocator associated with the operating system to give out fewer pages of cache 2050 from the highly contended for color, and more from the underutilized colors.

Exemplary Computer System Environment

Figure 8:
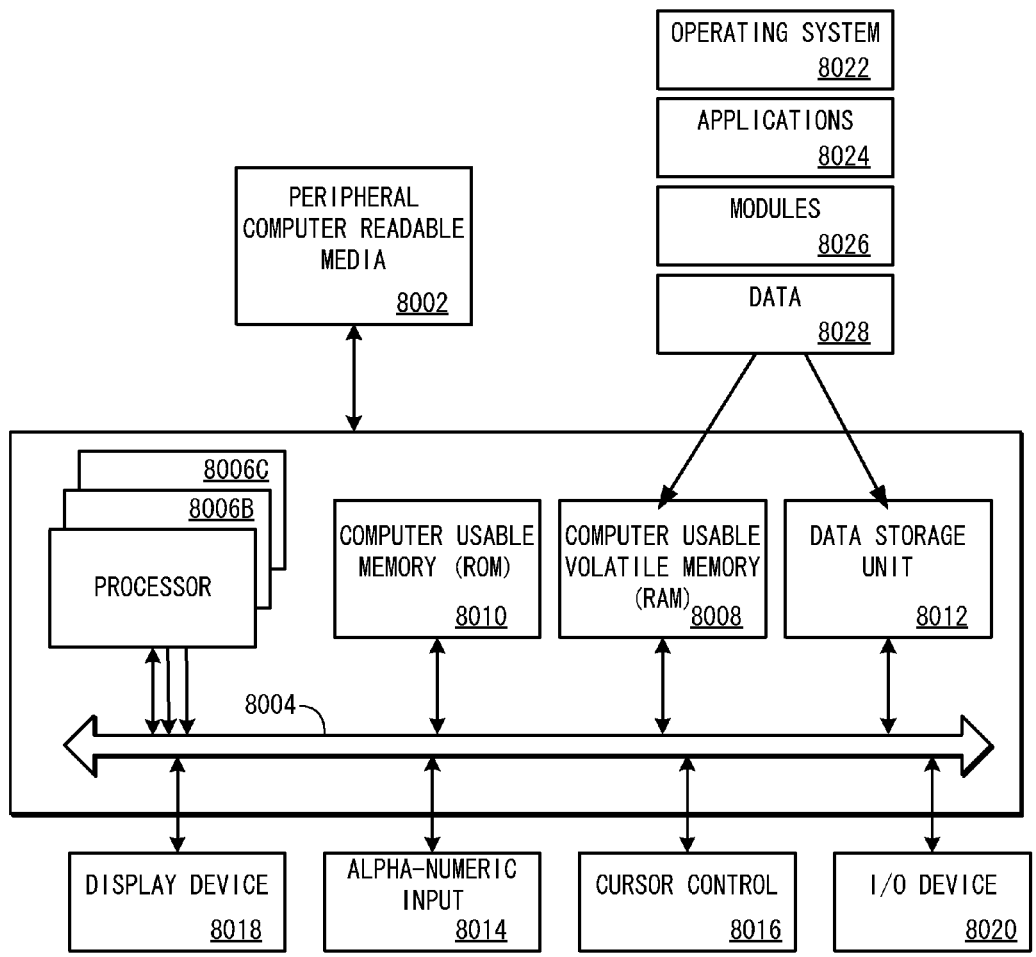
FIG. 8 is a diagram of an exemplary computer system upon which embodiments of the present invention may be practiced.

With reference now to FIG. 8, portions of the present invention are composed of computer-readable and computer-executable instructions that reside, for example, in computer-usable media of a computer system. That is, FIG. 8 illustrates one example of a type of a computer that can be used to implement embodiments of the present invention, which are discussed below. FIG. 8 illustrates an exemplary computer system 8000 that can be implemented from physical components, virtual components, or some combination thereof. It is appreciated that system 8000 of FIG. 8 is exemplary only and that the present invention can operate on or within a number of different computer systems including general purpose networked computer systems, NUMA systems, embedded computer systems, routers, switches, server devices, client devices, various intermediate devices/nodes, stand alone computer systems, physical computer systems, virtual computer systems, and the like. Computer system 8000 of FIG. 8 is well adapted to having peripheral computer readable media 8002 such as, for example, a floppy disk, a compact disc, a virtual disk and the like coupled thereto. System 8000 of FIG. 8 includes an address/data bus 8004 for communicating information, and a processor 8006A coupled to bus 8004 for processing information and instructions. As depicted in FIG. 8, system 8000 is also well suited to a multi-processor environment in which a plurality of processors 8006A, 8006B, and 8006C are present. Conversely, system 8000 is also well suited to having a single processor such as, for example, processor 8006A. Processors 8006A, 8006B, and 8006C may be any of various types of microprocessors, may have a single-core or multiple cores, and may be capable of simultaneous multi-threading operation.

System 8000 also includes data storage features such as a computer usable volatile memory 8008, e.g. random access memory (RAM), coupled to bus 8004 for storing and caching information and instructions for processors 8006A, 8006B, and 8006C. System 8000 also includes computer usable non-volatile memory 8010, e.g. read only memory (ROM), coupled to bus 8004 for storing static information and instructions for processors 8006A, 8006B, and 8006C. Also present in system 8000 is a data storage unit 8012 (e.g., a magnetic, optical disk, or virtual disk drive) coupled to bus 8004 for storing information and instructions. System 8000 also includes an optional alphanumeric input device 8014 including alphanumeric and function keys coupled to bus 8004 for communicating information and command selections to processor 8006A or processors 8006A, 8006B, and 8006C. System 8000 also includes an optional cursor control device 8016 coupled to bus 8004 for communicating user input information and command selections to processor 8006A or processors 8006A, 8006B, and 8006C. System 8000 of the present embodiment also includes an optional display device 8018 coupled to bus 8004 for displaying information.

Referring still to FIG. 8, optional display device 8018 may be a liquid crystal device, cathode ray tube, plasma display device or other display device suitable for creating graphic images and alphanumeric characters recognizable to a user. Optional cursor control device 8016 allows the computer user to dynamically signal the movement of a visible symbol (cursor) on a display screen of display device 8018. Many implementations of cursor control device 8016 are known in the art including a trackball, mouse, touch pad, joystick or special keys on alpha-numeric input device 8014 capable of signaling movement of a given direction or manner of displacement. Alternatively, it will be appreciated that a cursor can be directed and/or activated via input from alpha-numeric input device 8014 using special keys and key sequence commands. System 8000 is also well suited to having a cursor directed by other means such as, for example, voice commands. System 8000 also includes an I/O device 8020 for coupling system 8000 with external entities. For example, in one embodiment, I/O device 8020 is a modem for enabling wired or wireless communications between system 8000 and an external network such as, but not limited to, the Internet. A more detailed discussion of the present technology for identifying design issues in electronic forms is found below.

In FIG. 8, various other components are depicted for system 8000. Specifically, when present, an operating system 8022, applications 8024, modules 8026, and data 8028 are shown as typically residing in one or some combination of computer usable volatile memory 8008, e.g. random access memory (RAM) and data storage unit 8012. In one embodiment, the present technology for identifying design issues in electronic forms, for example, is stored as an application 8024 or module 8026 in memory locations within RAM 8008 and memory areas within data storage unit 8012.

Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of utilizing cache metadata to optimize memory access in a computer system having non-uniform memory access (NUMA) architecture including a plurality of nodes, each node having a processor, a local cache, and local volatile memory, said method comprising:

inspecting cache metadata associated with a set of cache locations of the local cache of one node of the plurality of nodes, wherein said inspecting is performed by software executing on one of the processors;

analyzing said cache metadata to determine an amount or frequency of use of remote memory locations stored in the local cache, the remote memory locations being volatile memory that is local to other nodes of the plurality of nodes; and optimizing memory access based on results of said analyzing, the optimizing comprising performing one of:

moving or replicating data stored in a first node of the plurality of nodes to a second node of the plurality of nodes or preferentially scheduling an observed process on a node that has been determined by the analyzing to contain data frequently accessed by said observed process.

2. The method of claim 1, wherein said inspecting of the cache metadata associated with the set of cache locations comprises receiving said cache metadata from cache hardware.

3. The method of claim 2, wherein said inspecting of the cache metadata associated with the set of cache locations further comprises requesting said cache metadata from said cache hardware.

4. The method of claim 1, wherein said analyzing of said cache metadata comprises sending a software command to the cache to forcibly evict cache data from a cache location.

5. The method of claim 1, wherein said analyzing of said cache metadata comprises:

inserting a known memory address into a cache location; and obtaining utilization rate and recency of use information by calculating how long it takes for the known memory address to be changed or evicted from the cache location by a process that uses the cache.

6. The method of claim 1, wherein said inspecting of cache metadata associated with the set of cache locations further comprises periodically inspecting refreshed metadata associated with said set of cache locations to determine changes in remote memory locations stored in said cache.

7. The method of claim 1, wherein said analyzing of said cache metadata comprises determining an amount of space used in said cache by remote memory locations stored in said cache.

8. The method of claim 1, wherein said analyzing of said cache metadata comprises determining a comparative frequency of use of remote memory locations stored in said cache.

9. The method of claim 1, wherein said analyzing of said cache metadata comprises determining a cache utilization rate for a portion of said cache.

10. The method of claim 1, wherein said analyzing said cache metadata comprises tracking utilization of remote memory over a period of time.

11. The method of claim 1, where in said cache metadata comprises a cache tag.

12. The method of claim 1, wherein said cache metadata comprises a recency of use status of a cache location.

13. The method of claim 1, wherein said cache metadata comprises a protocol state of a cache location.

14. The method of claim 1, wherein:
the optimizing comprises the moving or replicating of the data stored in the one storage area accessible by the cache to the other storage area accessible by the cache;
the first node is remote from the cache and the second node is local to the cache; and
the moving or replicating of the data optimizes memory access by improving locality of data storage, the data being moved or replicated being identified based on the analyzing of the cache metadata to identify the data as having a high degree of occupancy in said cache.

15. The method of claim 1, wherein:
the optimizing comprises the moving or replicating of the data stored in the one storage area accessible by the cache to the other storage area accessible by the cache;
the first node is remote from the cache and the second node is local to the cache; and
the moving or replicating of the data optimizes memory access by improving locality of data storage, the data being moved or replicated being identified based on the analyzing of the cache metadata to identify the data as being frequently accessed by said cache.

16. The method of claim 1, wherein the optimizing comprises the preferential scheduling of the observed process on a node determined by the analyzing to contain data frequently accessed by the observed process, the preferential scheduling optimizing memory access by improving locality of memory access.

17. The method of claim 1, further comprising reporting cache utilization information to a user or higher-level program, the user or higher-level program facilitating the optimizing.

18. A method of utilizing cache metadata to optimize memory access, said method comprising:
inspecting cache metadata associated with a set of cache locations of a cache, wherein said inspecting is performed by software;
analyzing said cache metadata to determine memory utilization; and
optimizing memory access based on results of said analyzing, the optimizing comprising moving or replicating of the data stored in one storage area accessible by the cache to an other storage area accessible by the cache, wherein the one storage location corresponds to an over-utilized cache subset and the other storage location corresponds to a less-utilized cache subset, and the moving or replicating of the data optimizes memory access by reducing contention within said cache.

19. A computer useable storage medium having computer-readable program code embodied therein for causing a computer system to perform a method of utilizing cache metadata to optimize memory access in a computer system having non-uniform memory access (NUMA) architecture including a plurality of nodes, each node having a processor, a local cache, and local volatile memory, said method comprising:
inspecting cache metadata associated with a set of cache locations of the local cache of one of the plurality of nodes, wherein said inspecting is performed by software executing on one of the processors;
analyzing said cache metadata to determine an amount or frequency of use of remote memory locations stored in the local cache, the remote memory locations being volatile memory that is local to other nodes of the plurality of nodes; and
optimizing memory access based on results of said analyzing, the optimizing comprising performing at least one of:
moving or replicating data stored in a first node of the plurality of nodes to a second node of the plurality of nodes or
preferentially scheduling an observed process on a node that has been determined by the analyzing to contain data frequently accessed by the observed process.

20. The computer useable storage medium as recited in claim 19, wherein said inspecting of the cache metadata associated with the set of cache locations comprises receiving said cache metadata from cache hardware.

21. The computer useable storage medium of claim 20, wherein said inspecting of the cache metadata associated with the set of cache locations further comprises requesting said cache metadata from said cache hardware.

22. The computer useable storage medium of claim 19, wherein said analyzing of said cache metadata comprises sending a software command to the cache to forcibly evict cache data from a cache location.

23. The computer useable storage medium of claim 19, wherein said analyzing of said cache metadata comprises:
inserting a known memory address into a cache location; and
obtaining utilization rate or recency of use information by calculating how long it takes for the known memory address to be changed or evicted from the cache location by a process that uses the cache.

24. The computer useable storage medium of claim 19, wherein said inspecting of cache metadata associated with the set of cache locations further comprises periodically inspecting refreshed metadata associated with said set of cache locations to determine changes in remote memory locations stored in said cache.

25. The computer useable storage medium of claim 19, wherein said analyzing of said cache metadata comprises determining an amount of space used in said cache by remote memory locations stored in said cache.

26. The computer useable storage medium of claim 19, wherein said analyzing of said cache metadata comprises determining a comparative frequency of use of remote memory locations stored in said cache.

27. The computer useable storage medium of claim 19, wherein said analyzing of said cache metadata comprises determining a cache utilization rate for a portion of said cache.

28. The computer useable storage medium of claim 19, wherein said analyzing said cache metadata comprises tracking utilization of remote memory over a period of time.

29. The computer useable storage medium of claim 19, where in said cache metadata comprises a cache tag.

30. The computer useable storage medium of claim 19, wherein said cache metadata comprises a recency of use status of a cache location.

31. The computer useable storage medium of claim 19, wherein said cache metadata comprises a protocol state of a cache location.

32. The computer useable storage medium of claim 19, wherein:
   the optimizing comprises the moving or replicating of the data stored in the one storage area accessible by the cache to the other storage area accessible by the cache;
   the first node is remote form the cache and the second node is local to the cache; and
   the moving or replicating of the data optimizes memory access by improving locality of the data, the data being moved or replicated being identified based on the analyzing of the cache metadata to identify the data as having a high degree of occupancy in said cache.

33. The computer useable storage medium of claim 19, wherein:
   the optimizing comprises the moving or replicating of the data stored in the one storage area accessible by the cache to the other storage area accessible by the cache;
   the first node is remote from the cache and the second node is local to the cache; and
   the moving or replicating of the data optimizes memory access by improving locality of data storage, the data being moved or replicated being identified based on the analyzing of the cache metadata to identify the data as being frequently accessed by said cache.

34. The computer useable storage medium as recited in claim 19, wherein the optimizing comprises the preferential scheduling of the observed process on a node determined by the analyzing to contain data frequently accessed by the observed process, the preferential scheduling optimizing memory access by improving locality of memory access.

35. The computer useable storage medium as recited in claim 19, wherein the method further comprises reporting cache utilization information to a user or higher-level program, the user or higher-level program facilitating the optimizing.

* * * * *

UNITED STATES PATENT AND TRADEMARK OFFICE
CERTIFICATE OF CORRECTION

PATENT NO. : 7,581,064 B1  Page 1 of 1
APPLICATION NO. : 11/410477
DATED : August 25, 2009
INVENTOR(S) : Zedlewski et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 204 days.

Signed and Sealed this

Fourteenth Day of September, 2010

David J. Kappos
*Director of the United States Patent and Trademark Office*